United States Patent Office

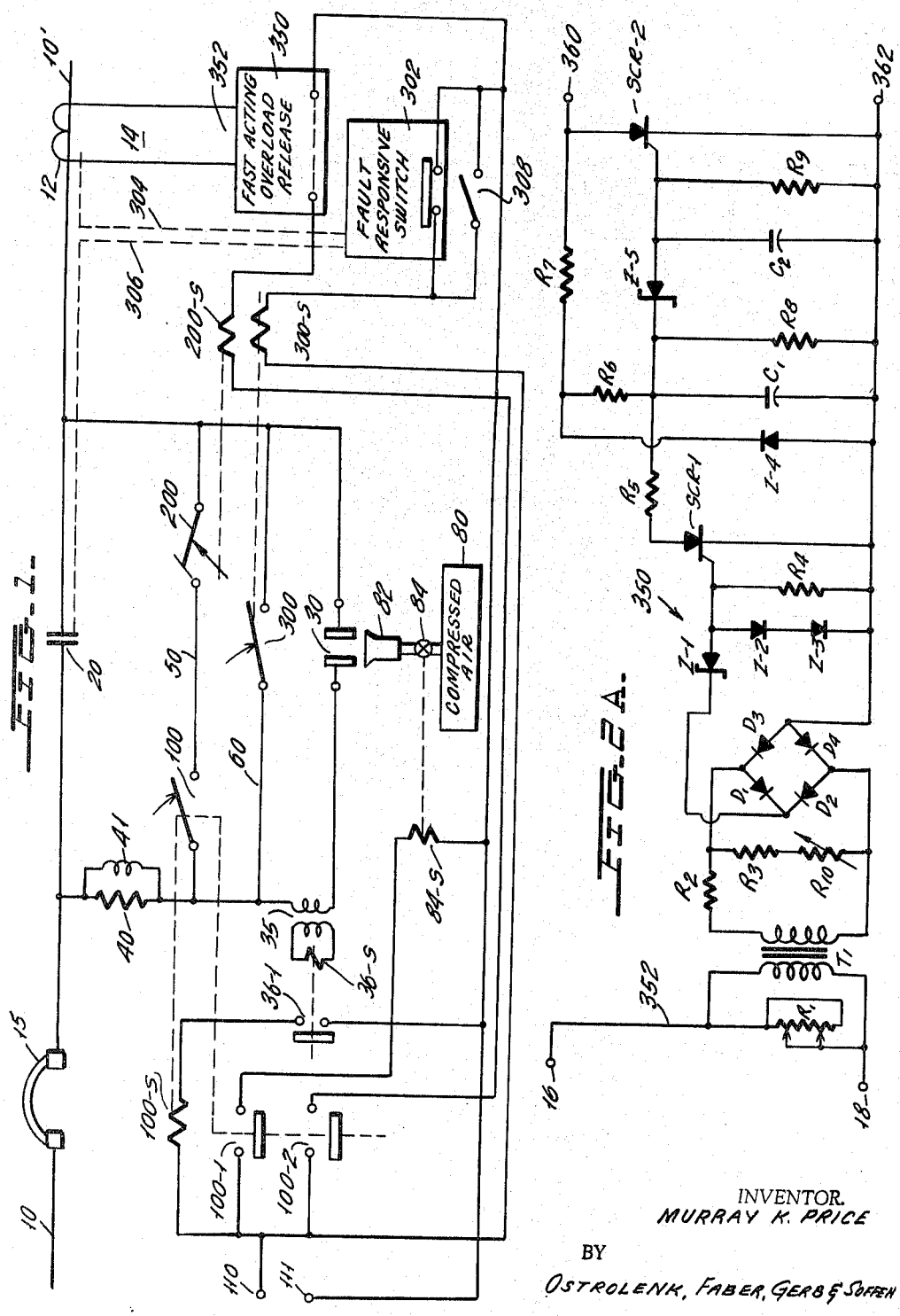

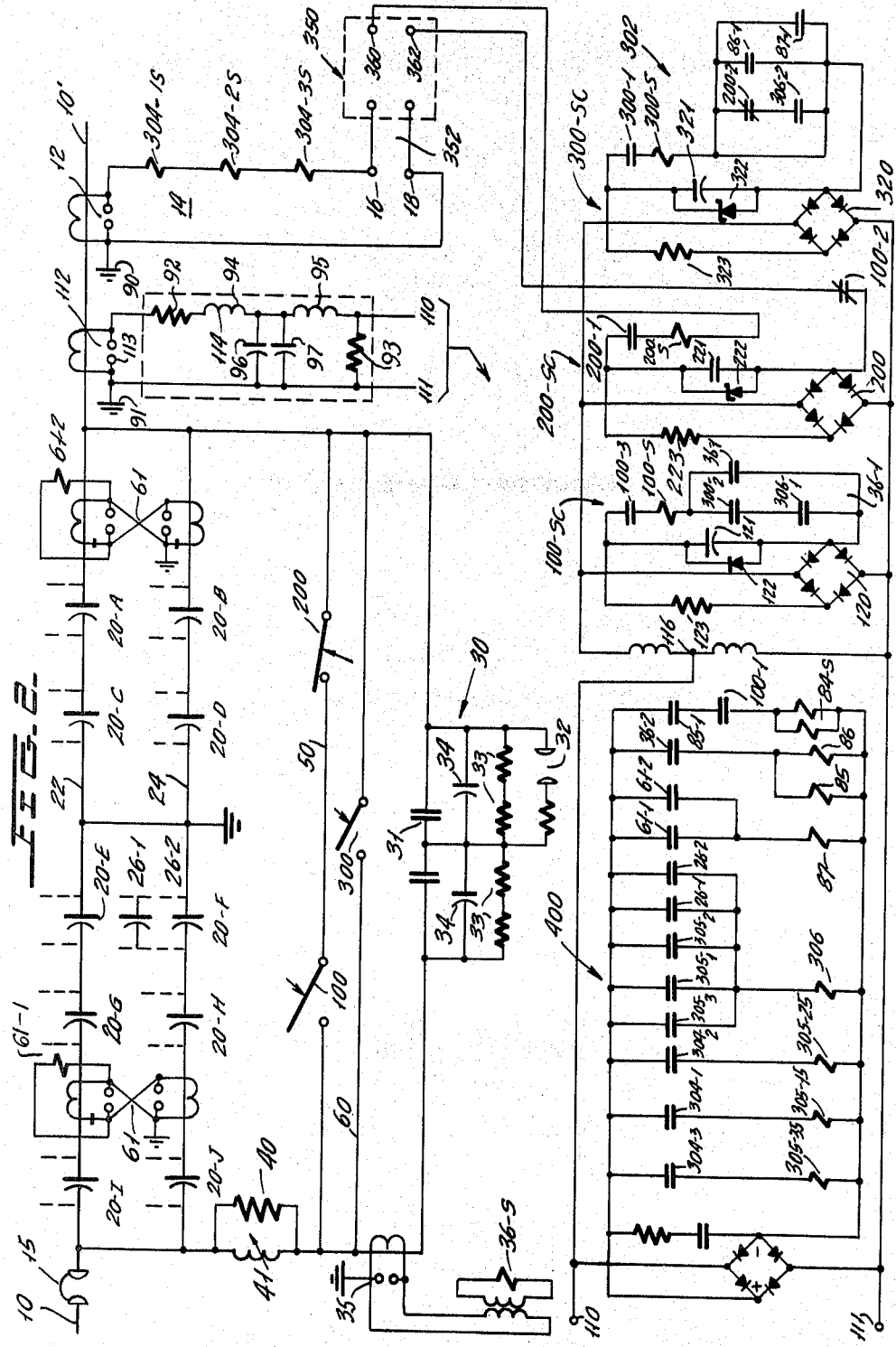

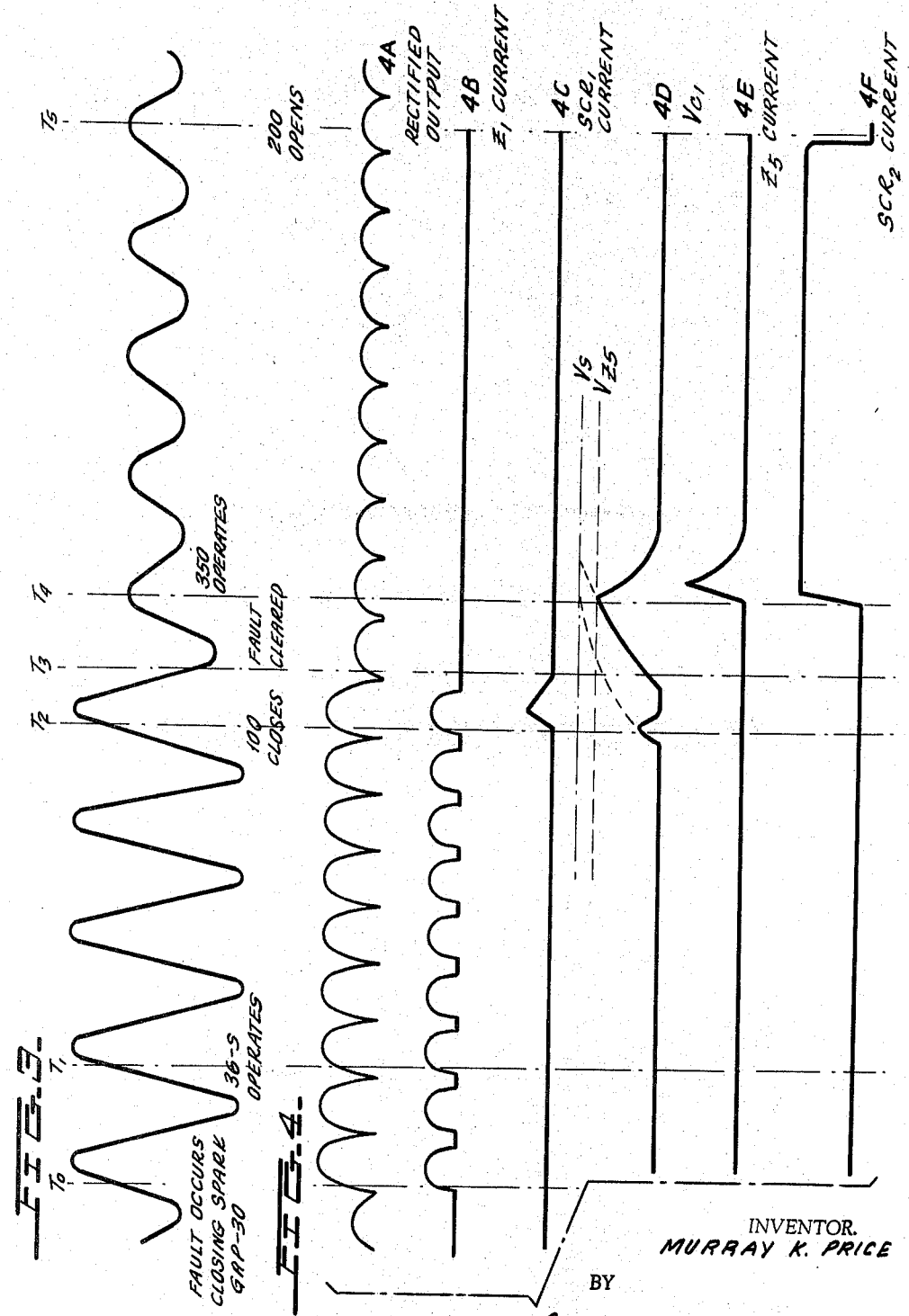

3,249,812
Patented May 3, 1966

3,249,812
OVERLOAD FAST RELEASE RELAY
Murray K. Price, Downsview, Ontario, Canada, assignor, by mesne assignments, to I-T-E Circuit Breaker (Canada) Limited, Port Credit, Ontario, Canada, a limited-liability company of Canada
Filed Feb. 18, 1963, Ser. No. 259,233
14 Claims. (Cl. 317—12)

My invention relates to a relay circuit rapidly responsive to line load in a high voltage alternating current power transmission line, and more particularly to such a relay circuit which is sequentially coordinated to the operation of a capacitor bank protective arrangement of the type shown in copending U.S. patent application Serial No. 259,238, filed on even date with the instant application entitled "Rapid Reinsertion Protection System for Series Capacitor Bank" in the names of Murray K. Price and Brian J. Gilson and assigned to the assignee of the instant application, to effect rapid reinsertion responsive to the clearing up of the line fault condition. Preferably the removal and reinsertion of the capacitor bank is to be accomplished within ten cycles after the initial occurrence of the fault condition.

Series capacitor banks are used in alternating current power transmission lines to improve system operation by neutralizing the line reactance. That is, the power transmission lines themselves are known to be inductive. The existence of such line inductance disadvantageously affects the power factor, transport capacity, stability and voltage regulation of the line. This condition is especially severe in the long distance, extra-high voltage lines (as for example, 230 kv. lines) which are currently coming into more frequent use.

To balance out the inductive reactance of the line, it is known to insert capacitors in series along the line of a sufficient magnitude to compensate for all or part of the line reactance. The voltage appearing across such series capacitors will be directly proportional to load current, therefore subjecting a non-protected series capacitor unit to an excessive voltage during the occurrence of a line fault condition. Although such capacitor units are capable of withstanding moderate overloads for brief periods, they will be subjected to serious damage should the line current exceed its normal value by an extensive amount.

The volume and price of a capacitor generally increases with the square of its maximum current rating. It is therefore economically undesirable to use series capacitors rated greatly in excess of normal line currents. Accordingly, it has become the practice to use a bank of capacitors rated at substantially normal loads, and to provide a rapid bypassing arrangement for the capacitor bank responsive to the presence of excessive fault conditions. The bypass circuit preferably operates almost instantaneously upon the occurrence of a fault in excess of a predetermined level. Such instantaneous operation may be obtained, for example, by an appropriately designed spark gap device in shunt relationship with the capacitor bank.

During the period in which the series capacitor bank is bypassed from the series line, it is effectively removed from aiding to neutralize the inductive reactance of the line. Since the system stability provided by the capacitor bank is particularly important immediately following the clearing up of the fault condition, it is essential that the protective system operate to restore the capacitor to the line as rapidly as possible after the danger of capacitor damage has been dissipated by the clearing up of the fault. Accordingly, my invention is directed for operation in conjunction with such a protective system for rapidly restoring the capacitor to the line, thereby maximizing its effectiveness while still maintaining adequate protection of the capacitor bank against overload damage. More particularly, my invention relates to a protective arrangement for rapidly sensing overload removal. The operation of the instant invention is circuit related to the protective system to extinguish the spark gap bypass circuit and restore the capacitor bank in series with the transmission line within a ten cycle period from the initiation of the overload condition.

Numerous series capacitor protective arrangements have been previously suggested to obtain such rapid restoration. One such arrangement utilizes an arc gap in the bypass circuit which is made self-clearing by means of an air blast continuously directed through the gap responsive to breakdown. The air blast is of sufficient strength to deionize the area between the arc electrodes, extinguishing the arc at every current zero after the arc is struck. Such extinguishment of the arc reinserts the capacitor bank in series with the transmission line. However, since it normally takes a number of cycles for the fault to be cleared, the arc will restrike at half cycle intervals intermediate the current zeroes from the time the arc is initially extinguished to the clearing up of the fault condition. This repetitive restriking of the arc has been found to give rise to transient voltages of sufficient magnitude to harm the capacitor bank. Another disadvantage of this arrangement is the need for the availability of a substantial source of compressed air to provide the continuous arc extinguishing blast.

Another attempt which has been suggested is to interrupt the bypass circuit by various arrangement of fast operating electromagnetic relays and switches, arranged in the circuit to sense the presence or removal of the overload condition. In such systems it has been observed that should normal current continue to flow in the transmission line when the overload condition is removed, the electromagnetic sensitive sensing relays are oftentimes relatively slow in resetting. This is particularly true where the capacitor bank is inserted in the main transmission line from the generating station. Such lines are rarely deenergized, with fault removal usually effected by the appropriate operation of branch line circuit breakers. As a result of such appreciable periods of delay from the time the overload condition ceases to exist to the actuation of the electromagnetic sensing relays, the series capacitor bank will not be reinserted in sufficient time to optimize its effectiveness in maintaining stability and reducing line losses.

My invention avoids these disadvantages of the previously practiced arrangements by providing a system coordinated solid state relay for the operation of a bypass circuit arrangement in shunt relationship with the spark gap. The bypass circuit includes the series arrangement of a normally opened and normally closed fast acting switch. The normally opened, or bypass disconnect switch, is rapidly closed responsive to the conduction of arc current. This provides a low impedance shunt path across the spark gap and capacitor bank out of the transmission line. The opening of the normally closed or bypass interrupter switch is effected by the instant invention. The relay is preferably an electronically operable solid state circuit including non-movable switching members, such as silicon controlled rectifiers and zener diodes, appropriately correlated to system load conditions. This relay is responsive well within the first cycle of the clearing up of the fault condition to actuate the interrupter switch, thereby restoring the series capacitor bank in the high voltage transmission line. In the preferred protective arrangement of aforementioned copending U.S. patent application Serial No. 259,238, the operating circuitry for the interrupter switch is in series relationship with a pair of auxiliary contacts controlled by the disconnect switch. This restricts the opening of the interrupter switch to sequentially follow the closing of the bypass circuit by the disconnect switch.

Within the present capabilities of existing commercial equipment, the bypass circuit may include a spring charged disconnect switch and interrupter switch in series relationship, both of which operate within a maximum of four cycles of the actuation of its tripping coil. Further, the fault condition will usually be removed by a line breaker within five cycles of its initial occurrence. Thus, the operation of the protective system may be as follows: Immediately upon the occurrence of the fault condition the spark gap will fire, thereby establishing a shunt path for capacitor protection. Within the next cycle the trip coil of the spring motor charged bypass disconnect switch is actuated, completing the bypass circuit well within five cycles from the initiation of the fault condition. A circuit including the fast acting overload release of the instant invention then serves to actuate the trip coil of spring motor charged bypass interrupter switch within one cycle from the clearing up of the fault by the line breaker. The interrupter switch will then be opened within a maximum time of four cycles from the actuation of its trip coil. Thus it is seen that the protective arrangement serves to instantaneously remove the capacitor bank from the high voltage lines responsive to a fault condition, and provide reinsertion of the capacitor bank into the distribution line within ten cycles from the time the fault condition occurs, but not until the fault condition is removed.

As further aspects of the protective arrangement, a relatively small source of compressed air is energized subsequent to the extinguishment of the arc gap to direct a short puff of air into the gap for the removal of ionized gases. The puff of air is preferably directed into the gap intermediate the closing of the disconnect switch and the opening of the interrupter switch to prevent a restrike of the arc upon opening of the bypass circuit. Advantageously the source of compressed air required for such removal of the ionized gas is of a substantially lesser magnitude than that required in the prior art arrangements which utilize a considerable blast of compressed air to extinguish the arc.

The protective system also contemplates the use of one or more overload responsive sensing members in cooperation with the protective arrangement to effect removal of the capacitor bank in the event of a prolonged moderate overload condition sufficient in magnitude and time duration to damage the capacitor bank, but of insufficient instantaneous value to break down the arc gap.

The system also contemplates the addition of a lockout series circuit in shunt relationship with respect to the capacitor bank, spark gap and bypass series circuit. Such a lockout series circuit may be actuated responsive to a variety of predetermined system faults such as excessive capacitor failure resulting in severe current unbalance within the capacitor bank; prolonged spark gap current; overload occurrence during the reset operation of the bypass when it is incapable of operating; and other mechanical failures.

The fast acting overload release is sequentially operable in conjunction with the system to provide rapid reinsertion responsive to the clearing up of the fault condition, but preventing such reinsertion during the continuance of overload. The instant invention is preferably constructed of solid state components for rapid operation and increased reliability. The circuit is basically a timing circuit responsive to the operation of the protective arrangement, and a load condition sensing circuit accurately responsive to overload. The timing and overload sensing circuits are interrelated to effect operation of the bypass interrupter corresponding to predetermined system conditions.

It is therefore seen that the basic concept of the instant invention resides in the rapid reinsertion of a series capacitor bank into an alternating current transmission line after fault removal, and preferably within a maximum of ten cycles delay after it has been protectively removed from the circuit.

It is therefore a primary object of my invention to provide for rapid reinsertion of a series capacitor bank within a transmission line following the clearing up of the fault condition.

A further object of my invention is to provide for the reinsertion of a protectively removed series capacitor bank within a maximum of ten cycles delay from the inception of the fault condition.

Another object of my invention is to provide overload sensing relay in conjunction with a series capacitor bank protective arrangement to effect rapid switching responsive to the clearing up of the fault condition.

An additional object of my invention is to provide such an overload sensing relay which includes a solid state component rapidly operable between blocking and conducting states responsive to sequentially related timing and overload responsive signals.

Still a further object of my invention is to provide such an overload sensing relay, wherein the operation between the blocking and conducting states will be effected, within the first cycle after the fault condition is cleared up subsequent to the bypass circuit of the protective system being completed.

Still another object of my invention is to provide a relay circuit for rapid reinsertion of a series capacitor installation which includes a silicon controlled rectifier rapidly switched responsive to the application of a gate signal, said gate signal being obtained by solid state circuitry sequentially responsive to line overload.

These as well as other objects of my invention will readily become apparent from the following description of the accompanying drawings in which:

FIGURE 1 is a simplified schematic diagram illustrating the basic operation of a series capacitor protective arrangement constructed to include the overload release relay of my invention.

FIGURE 2 is a diagrammatic representation of a single phase of a high voltage distribution line system having a series capacitor installation protected in the manner of above-mentioned copending U.S. patent application Serial No. 259,238, and utilizing a preferred embodiment of the instant invention.

FIGURE 2A is a schematic diagram of the fast acting overload release of my invention.

FIGURE 3 is a representative wave form diagram of line load during the occurrence and clearing up of an overload fault, and indicating the time sequence of operation of the rapid reinsertion system.

FIGURES 4a–f are wave form representations illustrating the operation of the fast acting overload release circuit of FIGURE 2A, corresponding to the times of FIGURE 3.

To facilitate an understanding of my invention, and particularly its sequential operation for rapid capacitor bank reinsertion, a discussion of an overall system of the type set forth in copending U.S. patent application Serial No. 259,238 is in order. It is to be understood that the instant invention is shown in conjunction with that system for illustrative purposes only, with its basic concepts being equally adaptable to other protective arrangements.

The figures for simplicity show only one phase of a power transmission system incorporating our rapid reinsertion protective arrangement. It is naturally understood that in actual practice three similar phases would ordinarily be employed. Also the actual three-phase system might preferably include interphase signalling means for operation of the individual phase protective circuitry in unison responsive to a fault condition in one of the phases. Such interphase signalling may, for example, take the form of motor actuated rotary columns formed of interrelated axial segments appropriately connected to the switching assemblies of the protective arrangement.

Referring to FIGURE 1 the line 10–10' is representative of one of the main transmission lines of a high voltage system, which may for example be a 230 kv. line. Series capacitor bank 20 is installed along the line for the purpose of balancing out the reactive impedance of the line, thereby improving the power factor, to effect an increase in power transport capacity of the line. Although capacitor 20 is diagrammatically shown as a single unit it normally consists of a fairly large installation including a number of individual units connected together in an appropriate series parallel arrangement to yield the necessary capacitive reactance and current rating.

Inasmuch as the interruption of a main line at the generator will cause severe power interruption, it is desirable to remove system faults by the proper operation of line breakers (not shown) situated towards the load end of the line. Accordingly, main transmission line circuit breaker 15 will usually be closed and line current will flow through capacitor bank 20. Upon the occurrence of a fault condition causing excessive currents to flow through line 10–10', capacitor bank 20 is protected from overvoltages by means of spark gap assembly 30 connected in shunt relationship with respect to the capacitor bank. Spark gap 30 is of an appropriate design, such as of the type shown in copending U.S. patent application Serial No. 234,770, entitled "Adjustable Precision Spark Gap," filed November 1, 1962, in the name of Otto Jensen, and assigned to the assignee of the instant invention, to break down and immediately become conducting when subjected to an instantaneous fault voltage, which would otherwise subject the capacitor bank 20 to serious damage. The parallel arrangement of resistor 40 and inductor 41 is preferably connected in series with the arc shunt circuit to limit the magnitude of the discharge current from capacitor bank 20 when the spark gap 30 initially breaks down, and to damp out oscillations of the capacitor discharge current.

Bypass series circuit 50 is provided in shunt relationship with respect to both capacitor bank 20 and spark gap 30. Bypass circuit 50 includes the series relationship of normally opened switch 100 and normally closed switch 200 which serves the purpose, as will be set forth below, of rapidly extinguishing the arc and reinserting the capacitor bank 20 back into the line responsive to the clearing up of the fault condition. Switches 100 and 200 are suitable fast acting devices, preferably of the spring motor charged variety, trip-biased to their other position and quickly operative responsive to the energization of trip-coil solenoids 100–s and 200–s respectively. Actuating solenoid 100–s is connected to terminals 110, 111 of an appropriate energizing potential source, through the series circuit including contact pair 36–1. Contact pair 36–1 is controlled by output relay 36–s of current sensitive tap-off 35 responsive to the flow of arc gap current. The breakdown of arc-gap 30, accompanied by the flow of arc current, energizes 36–s to close contacts 36–1 and thereby complete the energizing path of actuating solenoid 100–s to close switch 100. The closing of switch 100 completes bypass circuit 50 which by providing a lower impedance path than that of arc gap device 30 serves to extinguish the arc gap.

Rapid restoration of capacitor bank 20 in series with the transmission line is provided by the subsequent opening of switch 200. Actuating solenoid 200–s is connected to energizing source terminals 110, 111 through the series circuit arrangement of fast acting overload release 350 and contacts 100–2, the latter being auxiliary contacts closed responsive to the closing of switch 100. The fast acting overload release 350 which constitutes the subject matter of the instant invention includes an input 352 connected to line current pick-off device 12 to be responsive to the clearing up of the overload condition. As will be subsequently discussed, fast acting overload release 350 is designed to operate in sufficient time from the clearing up of the fault condition to effect reinsertion of capacitor bank 20 into the transmission line 10–10' within ten cycles from the time the fault initially occurs. In some of the prior art arrangements the overload release consisted of an electromagnetic relay coil or an appropriate circuit arrangement of such relay coils energized by a source proportionally related to the overload condition. While such relays may be designed to reset in a fairly rapid manner when the coil current approaches zero, they have been found to be relatively slow setting where normal current remains on the line upon the removal of the fault condition, such as is the usual case in the main transmission line. The protective arrangement of my invention preferably avoids this by being accurately responsive to the return of normal load.

The system also preferably includes a small source of compressed air 80, provided to a suitable outlet valve 82 positioned to emit a relatively short puff of air into the area enclosed by spark gap device 30. The emission of such air into the spark gap is controlled by valve 84, actuating solenoid 84–s of which is series connected to energizing source terminals 110, 111 through auxiliary contacts 100–1 controlled by the closing of bypass disconnect switch 100. Actuating coil 84–s is appropriately time delayed such that the compressed air is emitted into the spark gap 30 as a short puff after the arc therebetween is extinguished, and is for the sole purpose of removing the ionized gases from the spark gap. This operation is timed to occur prior to the opening of interrupter switch 200, thereby preventing restriking of the arc at lower than its adjusted value at such time as interrupter 200 is opened. It is to be noted that inasmuch as compressed air source 80 need only be used for a short interval to remove ionized gases after the arc is extinguished, it may be a substantially lesser source than that used in prior art arrangements wherein a compressed air source provides a strong blast of air for a sufficient duration to actually extinguish the arc.

The protective arrangement also contemplates a lockout series circuit 60 in shunt relationship with the capacitor bank 20 and protective shunt circuits 30 and 50. Lockout series circuit 60 includes a normally opened fast acting disconnect switch 300, actuated by solenoid 300–s. Solenoid 300–s is series connected to energizing source terminals 110, 111 through a device 302 generally referred to as a fault responsive switch in FIGURE 1, and more fully shown in FIGURE 2. Fault responsive switch 302 may include one or more system fault sensing inputs shown generally as 304, 306 which operatively control fault responsive switch 302 to complete the actuating circuit of solenoid 300–s. As will subsequently be discussed in conjunction with FIGURE 2, fault responsive switch 302 may be operated by such fault conditions as: a serious current unbalance within the capacitor bank overload during the bypass reset operation, or a prolonged flow of spark gap current. A switch 308 is also shown connected in parallel across fault responsive switch 302. Switch 308 may be manually operable or operable by remote control to permit removal of the capacitor bank.

Reference is now made to FIGURE 2 which diagrammatically illustrates a capacitor bank protective arrangement located at one phase of a high voltage transmission line, and wherein like numerals have been used to indicate those components previously designated in FIGURE 1. Capacitor bank 20 is seen to comprise a plurality of individual capacitor racks 20–A—20–J, connected in a series parallel relationship. Line 10, 10' may typically be the main transmission line of a 230 kva. system, which would accordingly require a considerable number of individual capacitor units to provide the appropriate amount of neutralizing capacitive reactance. For increased economy and reduced space requirements, it has been found preferable to form the individual capacitor racks of primarily 100 kvar. capacitors, such as the 4160 volt units shown in FIGURES 5, 5A, of the aforementioned application Serial No. 259,238.

For increased capacitor protection, capacitor bank 20 preferably includes appropriate current unbalance sensers 61 responsive to a serious unbalance condition between the lines 22, 24. Also, one or more of the capacitor racks, such as 20–F, includes thermally responsive switch means 26–1, 26–2. As will be subsequently discussed, the outputs 61–1, 61–2 of the current unbalance senser and 26–1 and 26–2 of the thermal device are operatively interconnected to the protective arrangement for removing the capacitor bank from line 10–10' under such conditions which may not have resulted in operation of the spark gap 30. Spark gap 30 may be of the general type discussed in aforementioned patent application Serial No. 234,770, and includes main gap 31, precision gap 32, resistors 33 and capacitors 34 to provide rapidly triggered and accurate break-down.

The control system energizing potential appearing between terminals 110, 111 is preferably obtained from transmission line 10–10', such as in the manner which is the subject of U.S. patent application Serial No. 259,181 in the name of Murray K. Price and Brian J. Gilson entitled "Constant Voltage Source for Operation of Series Capacitor Bank Protective Equipment" filed of even date with the instant application and assigned to the assignee of the instant invention. Such a voltage source is provided by saturable core transformer 112 and low pass filter 114 constructed to maintain a comparatively constant A.C. voltage between output terminals 110, 111 under widely varying conditions of line load current. As, for example, the constant voltage source arrangement set forth in the aforementioned copending U.S. patent application Serial No. 259,181 maintains the output voltage variation between 70 and 140 volts corresponding to line current variation from 50 to 6,000 amperes. This arrangement preferably avoids both the necessity of an auxiliary power source separate and distinct from the main power source, and the considerable expense of a potential transformer which would otherwise be required to go from the 230 kva. main line to a nominal 110 volt control circuit voltage. This advantageously permits all of the auxiliary equipment required to operate for the protection of the capacitor bank to be maintained at the platform level.

A suitable tap-off device 12 is provided along the line 10–10' to provide a current flow through series path 14 proportionally related to line load. Circuit 14 includes output terminals 16, 18 which supply the input signal 352 to the fast acting overload release circuitry of the instant invention generally shown as 350. Circuit 14 is also shown as including a number of relays 304–1, 304–2, 304–3 connected to time delay relays appropriately designed to pick up responsive to the existence of predetermined moderate overload conditions for prolonged periods of time.

The solenoid actuating circuits of fast acting protective system switches 100, 200, 300 are generally shown as 100–sc, 200–sc and 300–sc respectively. These circuits are parallel connected to potential source 110, 111, as for example via auto transformer 116. The control voltage available from the output of auto transformer 116 is presented to rectifying and voltage stabilizing circuitry of each of the solenoid actuating circuits to provide a constant source of D.C. potential. This circuitry includes bridge rectifier 120, capacitor 121, zener diode 122 and resistor 123, as shown in the input of circuit 100–sc. Similarly, components 220–223 and 320–323 are shown included in circuits 200–sc and 300–sc. The potential source terminals 110, 111 are also presented to a control circuit arrangement generally shown as 400, which as will be subsequently discussed is operatively associated with the solenoid control circuits of the protective switching arrangement to afford capacitance bank protection responsive to a variety of system abnormalities.

System operation

Responsive to an excessive voltage condition above a certain predetermined level, spark gap device 30 will rapidly fire, striking an arc therebetween to shunt remove capacitor bank 20 from the line. The flow of arc current is sensed by 35, thereby actuating relay solenoid 36–s. This causes the closing of contact 36–1, located in the disconnect switch actuating circuitry 100–sc. The closing of contacts 36–1 completes the actuating circuit for solenoid 100–s through the normally closed auxiliary contacts 100–3. Fast acting disconnect switch 100 is then closed to extinguish the arc by diverting current through bypass path 50. The closing of disconnect switch 100 also serves to close auxiliary contacts 100–1, 100–2 and open auxiliary contact 100–3. Disconnect switch 100 may also include other auxiliary contacts (not shown) to initiate the spring motor charging of its operating spring, and provide interphase signalling.

The closing of contacts 100–2 provides an energizing path for interrupter solenoid 200–s through normally closed auxiliary contact 200–1, and terminals 360, 362 of fast acting overload release 350. As will be subsequently discussed in conjunction with the circuitry of 350, terminals 360, 362 are operatively related to line condition to be rapidly closed upon the clearing up of the fault condition. Upon such closing of terminals 360, 362, solenoid 200–s will be energized. Fast acting interrupter switch 200 is then opened, serving to reinsert capacitor bank 20 in series relationship with the transmission line 10–10'.

Reference is now made to FIGURE 3, which illustrates the sequential timing of rapid capacitor reinsertion provided by my invention. Time $T_0$ corresponds to the occurrence of the fault condition, and the substantially instantaneous firing of the spark gap device 30. Current senser 35 and its operating relay 36 are of a standard commercial variety, operable to close contact 36–1 in a maximum period of one cycle from the occurrence of arc current, at which time ($T_1$) disconnect tripping solenoid 100–s is energized. Bypass disconnect switch 100, of a conventional design to safely withstand the high capacitor bank ratings, is operable within the present capabilities of the art to close within approximately three cycles from the energization of tripping solenoid 100–s. Thus, at $T_2$ approximately four cycles from the initiation of the fault condition, bypass circuit 50 is completed to extinguish the arc. The line is protected by a suitable arrangement of circuit breakers (not shown) which, for most fault conditions, will remove the fault from main transmission line 10–10' within 4–5 cycles after $T_0$. The removal of the fault condition at $T_3$ is sensed by overload release 350 of the instant invention which in the manner to be subsequently discussed operates within approximately ¾ of a cycle from $T_3$ to close the circuit gap between terminals 360, 362. At this time, $T_4$, solenoid 200–s of fast acting interrupter switch 200 is energized. Interrupter switch 200 may be operable within the present capabilities of the art to open its contacts within a maximum of four cycles from the energization of coil 200–s. Thus, it is seen that our protective system provides reinsertion of capacitor bank 20 within a ten cycle period from the initial fault condition, while preventing reinsertion until the fault is removed.

Referring again to FIGURE 2 the operation of other aspects of the system will now be considered.

The actuation of arc current sensing relay 36–s and the closing of its associated contacts 36–2 energize relay 85, thereby closing its contacts 85–1. Contacts 85–1 are in series circuit relationship with air valve actuating solenoid 84–s and normally opened auxiliary contacts 100–1, the latter being closed by the closing of bypass disconnect switch 100. Thus, upon picking up of relay 85 and the closing of bypass disconnect switch 100, air valve solenoid 84–s will be actuated to provide a puff of air into the main spark gap 30 for cleaning away the ionized gases (schematically shown in FIGURE 1). The pickup of relay 85 and the energization of air valve solenoid 84–s are appropriately time related such that the puff of air will be emitted into the spark gap subsequent to arc extinguishment by the closing of disconnect switch 100, but prior to the opening of interrupter switch 200.

The pickup of any of the moderate overload sensing relays 304–1s, 304–2s or 304–3s closes its associated contact 304–1, 304–2 or 304–3 located in the general control circuitry shown as 400. The closing of any of such contacts energizes one of its associated time delayed relays 305–15, 305–25 or 305–35, closing associated contacts of the latter 305–1, 305–2, or 305–3 responsive to the moderate overload condition existing for predetermined time intervals. Contacts 305–1, 305–2 and 305–3 are in parallel relationship with respect to the contacts 26–1, 26–2, controlled by the output of the thermal device located within the capacitor bank. Hence, the existence of any one of a plurality of predetermined moderate overload conditions for a continuous interval, or of an excessive temperature condition within the capacitor bank 20 serves to energize relay coil 306 in series relationship with respect to the aforesaid parallel arrangement of contacts. The energization of relay 306 will close its contacts 306–1, 306–2, located in the general circuitry of 100–sc, and 302 respectively.

Contact 306–1 is in series relationship with actuating solenoid 100–s, through auxiliary contact 300–2 (closed when lockout switch 300 is in its normally opened position) and auxiliary contacts 100–3 (closed when disconnect switch 100 is in its normally open position). Thus it is seen that the actuation of coil 306 responsive to the aforedescribed moderate overload or capacitor bank thermal conditions will serve to actuate bypass disconnect switch 100, providing that lockout switch 300 has not been closed and switch 100 has not already been actuated responsive to arc current.

Contact 306–2 is similarly in series relationship with actuating solenoid 300–s of the lockout switch through series connected contacts 300–1 (closed when lockout switch 300 is in its normally open position), 200–2 (closed when interrupter 200 has been operated to its opened position). Thus, the actuation of relay 306 will alternately actuate lockout switch 300 to close auxiliary bypass circuit 60 should the circuit fault condition occur subsequent to the sequential operation of switches 100 and 200, and before they have been reset to their original positions.

Lockout switch 300 may alternatively be energized by the closing of contacts 86–1 or 87–1. The closing of contacts 86–1 is governed by the operation of time delay relay 86 in the circuit of arc current sensing contact 36–2. Thus, current flow through the spark gap for an extended length of time will serve to close lockout switch 300, via time delay relay switch 86. Contacts 87–1 are closed by the actuation of relay 87. Relay 87 is in series relationship with contacts 61–1, 61–2 of the capacitor bank current unbalance sensors, and will be actuated responsive to a predetermined unbalance condition.

*Fast acting overload release*

Proper timing for the actuation of bypass interrupter 200 is provided by a novel circuit arrangement generally designated as 350, the circuit of which is shown in FIGURE 2A. The input signal 352 at terminals 16, 18 is generally sinusoidal and proportional in magnitude to line load in the manner shown in FIGURE 3. To appropriately relate the input signal magnitude to the circuit parameter, the signal is applied to adjustable resistor R1, connected to the input terminals of amplifying transformer T1. The signal is then presented to a full wave rectifier circuit comprising the bridged arrangement of diodes D1–D4. The full wave rectifier output signal is shown by wave form 4A. Zener diode Z–1 is selected such that when the magnitude of the signal 4A presented to it exceeds a value representative of an overload condition, it will break down and become conducting. Thus, referring to wave form 4B of the current condition through zener diode Z–1, break-down occurs at half-cycle intervals from $T_0$–$T_3$, the time during which the fault remains on the line and the rectified signal 4A is of a magnitude representative of a line fault condition. Zener diode signal 4B, characterized by the half cyclic breakdown of zener diode Z–1 corresponding to the presence of an overload condition, is then applied as a gating signal to a suitable solid state switch, such as silicon control rectifier SCR–1. The circuit of SCR–1 is completed through R–5, R–6 and R–7, at time $T_2$ corresponding to the closing of disconnect switch auxiliary contact 100–2 (refer to FIGURE 2 for the circuit relationship of 100–2). The circuit of SCR–1 is designed such that it will not fire unless Z–1 breaks down to apply a gating signal thereto. Thus SCR–1 will fire during the time an overload condition is sensed by the lefthand portion of the circuit as shown in FIGURE 2A. Further, the circuit parameters of SCR–1 are carefully chosen such that it will cease conducting every half cycle each time the signal to its gate passes through zero.

Referring to waveform 4c of the current through SCR–1, firing occurs from time $T_2$ at half cycle intervals during the application of gate signal 4B, with SCR–1 conduction ceasing at zero gate. Only one such firing is shown in the particular timing sequence shown in FIGURE 4, inasmuch as the illustrative system operation provides a short interval between $T_2$ and $T_3$. However, should the fault remain for a longer interval after $T_2$, SCR–1 will similarly break down and become conducting every half cycle within such an interval till the fault is removed.

Closing of auxiliary contacts 100–2 of the bypass disconnect switch causes an energy storage device, such as capacitor C–1 to be charged towards source potential through the series arrangement of resistors R–6 and R–7. The parameters of capacitor C–1, R–6 and R–7 are chosen in conjunction with the magnitude of the control system source potential such that it will take approximately ¾ of a cycle for capacitor C–1 to reach a potential corresponding to the breakdown potential of zener diode Z–5. Also, the firing of SCR–1 by the overload responsive signal gate 4B is sequentially related to the charging cycle of C–1 such as that SCR–1 fires before C–1 will reach the breakdown potential of zener diode Z–5. The firing of SCR–1 provides a low impedance shunt path across capacitor C–1, thereby discharging the capacitor and preventing it from reaching a voltage sufficient to fire zener diode Z–5.

Upon clearing up of the fault at time $T_3$, SCR–1 will cease firing, permitting C–1 to reach a potential sufficient to cause zener diode Z–5 to break down and become conducting. This condition is represented by wave form 4–D of the capacitor voltage. At times $T_2$ corresponding to the completion of the capacitor charging circuit, C–1 begins to charge towards source potential at a rate determined by R–6, R–7 and C–1. Upon firing of SCR–1 a low impedance path is provided across the capacitor thereby rapidly discharging C–1. At time $T_3$ the fault has been removed, and SCR–1 remains in its non-conducting state. Since the charging of capacitor C–1 is no longer interrupted by the firing of SCR–1, the capacitor continues to charge until the breakdown voltage, V–Z5, of zener diode Z–5 is reached. This will occur within a maximum period of ¾ of a cycle from fault removal at $T_3$, resulting in a gating signal shown in 4E to be applied to an appropriate solid state switch, such as SCR–2. SCR–2 will then fire and become conducting to provide a low impedance path between output terminals 360, 362. The effective closing of the circuit between terminals 360, 362 will then permit sufficient current flow in circuit 200–sc to actuate the interrupter trip solenoid 200–s. It is thus seen that the circuit arrangement of 350 combines the output of an overload responsive section and a timing section to provide actuation of the interrupter switch for restoration of the capacitor bank within approximately ¾ of a cycle from the clearing up of the fault condition. A ¾ cycle timing arrangement is preferably provided in the above described half-cycle peak current scan arrangement to provide a safety factor between the sequential operation of the overload responsive and timing sections.

Variable resistors R–1 and R–10 are preferably provided to serve as coarse and fine adjustments respectively, to correlate the input signal magnitude at 16–18 to the individual characteristics of Z–1 and SCR–1. Small zener diodes Z–2, Z–3 are provided for the protection of SCR–1 in the event of an excessively large gate signal. Resistor R–4 is provided to stabilize the operation of SCR–1. Similarly, resistor R–9 and capacitor C–2 are provided to stabilize the operation of SCR–2. Zener reference diode Z–4 is provided across R–6 and C–1 to maintain a constant time delay during periods of supply voltage fluctuation. A high magnitude resistor R–8 is applied across capacitor C–1 to discharge any partial charge remaining on the capacitor.

Without thereby limiting the scope of the invention, there are given below representative component parameters which may be employed in the circuit of FIGURE 2A.

R1—1 ohm, 75 watt adjustable.
R2—1000 ohm, 5 watt.
R3—2200 ohm, ½ watt.
R4—2.2K ohm, ½ watt.
R5—47 ohm, ½ watt.
R6—75K ohm, ½ watt.
R8—.1M ohm, ½ watt.
R9—5.6K ohm, ½ watt.
R10—2000 ohm, 10 watt adjustable.
C1—.5 mmf., 400 v.
C2—.01 mfd., 150 v.
D1-4—Silicon rectifier type IN538.
Z1—Zener diode, 1 watt, type 4J Z4 x 16B.
Z2, Z3—Zener diode, "Stabistor" Transitron SG–22.
Z4—Zener diode, 1 watt, type IN 1791.
Z5—Zener diode, ¼ watt, type SV 139.
SCR–1—Silicon controlled rectifiers 1 amp, 25 volt type TCR251.
SCR–2—Silicon controlled rectifiers 1 amp, 200 volt type TCR2001.

It is therefore seen that my invention provides an improved condition responsive relay for the rapid insertion of the capacitor bank upon the clearing up of the fault condition while preventing such reinsertion during fault continuance.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows.

1. In combination:
a capacitor in electrical series with an alternating current transmission line;
first means responsive to a predetermined fault condition for establishing a first shunt path across said capacitor;
second means responsive to current flow in said first shunt path for establishing a second shunt path across said capacitor, the establishment of said second shunt path interrupting said first shunt path;
third means connected within said second shunt path and operable between a first state which maintains said second shunt path, and a second state which interrupts said second shunt path to reinsert said capacitor in electrical series with said transmission line; and
fast-acting operating means connected to said third means for operation thereof in response to the clearing up of the fault condition, said fast-acting operating means including switching means operable between a first and second state, corresponding to the existence and clearing up of the fault condition, respectively, for operating said third means between its first and second state, respectively.

2. The combination of claim 1, wherein said switching means changes from its first operating state to its second operating state within the first cycle after the fault condition is cleared up.

3. In combination:
a capacitor in electrical series with an alternating current transmission line;
first means responsive to a predetermined fault condition for establishing a first shunt path across said capacitor;
second means responsive to current flow in said first shunt path for establishing a second shunt path across said capacitor, the establishment of said second shunt path interrupting said first shunt path;
third means connected within said second shunt path and operable between a first state which maintains said second shunt path, and a second state which interrupts said second shunt path to reinsert said capacitor in electrical series with said transmission line; and
fast-acting operating means connected to said third means for operation thereof in response to the clearing up of the fault condition, said fast-acting operating means including;
an electronic switching circuit comprising a first electronic element operable between a blocking and conducting state for operating said third means between its first and second state, respectively, in response to preselected electrical signals presented thereto; and
an electric circuit connected to said first electronic element for presenting said preselected electrical signals to said first electronic element, said preselected electronic signals corresponding to cyclic variations of the transmission line current due to the existence or absence of said fault condition.

4. The combination of claim 3, wherein said first electronic element comprises a silicon controlled rectifier.

5. In combination:
a capacitor in electrical series with an alternating current transmission line;
first means responsive to a predetermined fault condition for establishing a first shunt path across said capacitor;
second means responsive to current flow in said first shunt path for establishing a second shunt path across said capacitor, the establishment of said second shunt path interrupting said first shunt path;
third means connected within said second shunt path and operable between a first state which maintains said second shunt path and a second state which interrupts said second shunt path to reinsert said capacitor in electrical series with said transmission; and
fast-acting operating means connected to said third means for operation thereof in response to the clearing up of said fault condition, said fast-acting operating means comprising;

an electronic switching circuit including a first electronic element operable between a blocking and conducting state for operating said third means between its first and second state, respectively, in response to a first and second electrical signal, respectively;

a fault sensing circuit electrically connected to said first electronic element for presenting said first electric signal to said first electronic element, said first electric signal corresponding to the continuance of said fault condition; and a timing circuit electrically connected to said first electronic element for presenting said second electrical signal to said first electronic element, said second electric signal corresponding to the cyclic variation of the transmission line current due to the clearing up of said fault condition; said first and second electrical signals being in a predetermined time relationship to effect the operation of said first electronic member to its conducting state within the first cycle after the fault condition is cleared up.

6. The combination of claim 5, wherein said timing circuit includes potential chargeable means energized by a potential source and connected to said first electronic element, and control means connected to said potential source and said potential chargeable means, said control means regulating charging of said potential chargeable means to a first predetermined value within a first predetermined time interval, charging of said potential chargeable means to said first predetermined value operating said first electronic element from its blocking to its conducting state within the first cycle after the fault condition is cleared up.

7. In combination:
a capacitor bank in electrical series with an alternating current transmission line;
first means responsive to a predetermined fault condition for electrically removing said capacitor bank from the transmission line;
second means responsive to the clearing up of the fault condition to reinsert said capacitor bank in electrical series in the transmission line;
energizable operating means for activating said second means, said energizable operating means being electrically connected to a first switch means having a first and second operating state, said operating means being energized within a sufficiently short time to effect capacitor bank reinsertion within ten cycles after the initiation of the fault condition when said first switch means is in its second operating state;
a timing circuit and a fault sensing circuit connected to said first switch means, said timing circuit and fault sensing circuit having means for operating them in a predetermined timed relationship to operate said first switch means to its second operating state.

8. The combination of claim 7, wherein said first switch means, said timing circuit and said fault sensing circuit include solid-state electronically operable components.

9. The combination of claim 7, wherein said timing circuit includes potential chargeable means energized by a potential source and connected to said first switch means, and control means connected to said potential source and said potential chargeable means, said control means regulating charging of said potential chargeable means to a first predetermined value, within a first predetermined time interval, charging of said potential chargeable means to said first predetermined value operating said first switch means from its first to its second operating state.

10. The combination of claim 9 wherein said fault sensing circuit includes a second switch means connected to said potential chargeable means, circuit means responsive to said transmission line for applying a signal to said second switch means proportional to the current flowing in said transmission line; said second switch means having a first operating state corresponding to a non-fault transmission line condition, and a second operating state corresponding to a line fault condition, the operation of said second switch means to its second operating state preventing said potential chargeable means from reaching said first predetermined value.

11. A switching apparatus comprising a pair of output terminals; a first switch means connected to said pair of output terminals; said first switch means having a first and second operating state; said first operating state establishing a high impedance between said pair of output terminals, and said second operating state establishing a low impedance between said pair of output terminals; said first switch means being connected to a timing circuit and a condition sensing circuit, said timing and condition sensing circuits applying signals in a predetermined timed relationship to said first switch means to operate said first switch means from its first to its second operating state; said timing circuit including potential chargeable means connected to a potential source; control means connected to said potential source and said potential chargeable means; said control means permitting charging of said potential chargeable means to a first predetermined value, within a first predetermined time interval; said potential charging means connected to said first switch means, whereby the charging thereof to said first predetermined value operates said first switch means from its first to its second operating state.

12. The switching apparatus as set forth in claim 11, and further including a pair of input terminals for the application of a signal responsive to an external condition; said condition sensing circuit including a second switch means connected to said potential chargeable means; means connected between said input terminals and said second switch means for applying a signal to said second switch means proportional to the signal applied to said input terminals; said second switch means having a first operating state in response to a first magnitude of the signal applied thereto, and a second operating state in response to a second magnitude of the signal applied thereto; operation of said second switch means to its second operating state in response to the reception of said second magnitude of the signal applied thereto preventing said potential chargeable means from reaching said first predetermined value.

13. The switching apparatus as set forth in claim 12, wherein the operation of said second switch means to said second operating state occurs at regular intervals during the presence of said second magnitude condition; said regular intervals being less than said first predetermined time interval to thereby prevent said potential chargeable means from being charged to said first predetermined value; the return of said second switch means to said first operating state in response to reception of said first magnitude of the signal applied thereto permitting said potential chargeable means to be charged to said first predetermined value.

14. A switching apparatus comprising a pair of input and output terminals; a first solid-state switch means operative between a blocking and conducting state responsive to electrical signals presented thereto; a timing circuit presenting a first electrical signal to said first switch means, and a condition sensing circuit presenting a second electrical signal to said first switch means responsive to an external signal applied to said input terminals; said first and second electrical signals being in a predetermined timed relationship to selectively operate said first switch means from one to the other of its said states; a second solid-state switch means intermediate said pair of output terminals, and operative between a blocking and conducting state responsive to the operation of said first switch means, whereby the impedance between said output terminals may be switched from a high to a substantially lower value, in a predetermined sequential relationship with respect to the signal applied to said input terminals and the operation of said timing circuit.

References Cited by the Examiner

UNITED STATES PATENTS

| | | | |
|---|---|---|---|
| 2,660,693 | 11/1953 | Marbury | 317—12 |
| 2,664,525 | 12/1953 | Diebold | 317—12 |
| 2,819,429 | 1/1958 | Skeats | 317—12 |
| 3,158,786 | 11/1964 | Hurtle | 317—33 |

SAMUEL BERNSTEIN, *Primary Examiner.*

RAPHAEL V. LUPO, *Assistant Examiner.*